(12) United States Patent
Berggren

(10) Patent No.: US 7,252,077 B2
(45) Date of Patent: Aug. 7, 2007

(54) SEQUENTIAL CONTROL VALVE

(75) Inventor: Gustav Berggren, Stockholm (SE)

(73) Assignee: Haldex Hydraulics AB (SE)

( * ) Notice: Subject to any disclaimer, the term of this patent is extended or adjusted under 35 U.S.C. 154(b) by 0 days.

(21) Appl. No.: 11/343,423

(22) Filed: Jan. 31, 2006

(65) Prior Publication Data

US 2007/0023018 A1   Feb. 1, 2007

Related U.S. Application Data

(60) Provisional application No. 60/703,480, filed on Jul. 28, 2005.

(51) Int. Cl.
*F02M 25/07* (2006.01)
*F02B 47/08* (2006.01)

(52) U.S. Cl. .......................... 123/568.17; 123/568.18; 123/568.19

(58) Field of Classification Search ..................
123/568.17–568.19, 568.21–568.3, 568.11;
60/605.2; 137/892; 701/108
See application file for complete search history.

(56) References Cited

U.S. PATENT DOCUMENTS

| | | | | |
|---|---|---|---|---|
| 1,793,556 A * | 2/1931 | Moore | ................... | 123/568.17 |
| 3,741,179 A * | 6/1973 | Vartanian | ................ | 123/568.18 |
| 4,043,304 A * | 8/1977 | Stumpp et al. | ......... | 123/568.18 |
| 4,149,503 A * | 4/1979 | Ozaki et al. | ........... | 123/568.19 |
| 4,171,688 A * | 10/1979 | Takahashi | ............... | 123/568.19 |
| 6,039,034 A * | 3/2000 | Field et al. | ............. | 123/568.18 |
| 6,343,594 B1 * | 2/2002 | Koeslin et al. | ......... | 123/568.17 |
| 6,640,542 B2 * | 11/2003 | Coleman et al. | ........ | 123/568.17 |
| 6,708,677 B2 * | 3/2004 | Brosseau et al. | ....... | 123/568.18 |
| 7,036,493 B1 * | 5/2006 | Huebler et al. | ......... | 123/568.17 |
| 7,036,529 B2 * | 5/2006 | Berggren et al. | ....... | 123/568.17 |
| 2006/0180224 A1 * | 8/2006 | Berggren et al. | ...... | 123/568.17 |

* cited by examiner

*Primary Examiner*—Willis R. Wolfe, Jr.
(74) *Attorney, Agent, or Firm*—St. Onge Steward Johnson & Reens LLC

(57) ABSTRACT

A system for controlling the mixture of an air flow and an exhaust gas flow utilizing two valves, the first valve at least partially positioned in an air intake conduit and regulating the flow of fluid through the air conduit, and the second valve positioned in an exhaust gas recirculation conduit for regulating the flow of exhaust gas. The control scheme presenting a sequential or stepwise control sequence, where the first valve is actuated over a first pressure range and the second valve is actuated over a second pressure range such that valves operate in a sequential manner.

29 Claims, 5 Drawing Sheets

SEQUENTIAL CONTROL VALVE

CROSS-REFERENCE TO RELATED APPLICATIONS

This application claims the benefit of the filing date of U.S. Provisional Patent Application Ser. No. 60/703,480 filed Jul. 28, 2005.

FIELD OF THE INVENTION

The present invention relates to a system for controlling the mixture of an inlet air flow and an exhaust gas return flow in an engine. More specifically, the invention relates to a sequential control system for controlling the quantity of each flow.

BACKGROUND OF THE INVENTION

The expulsion of NOx by an internal combustion engine is typically controlled by limits established by local, state and federal governmental regulations. The formation of NOx constituents must therefore be maintained at least below some threshold limit or level. It is generally understood that the presence of $NO_x$ in the exhaust of internal combustion engines is determined by combustion temperature and pressure as well as by the air/fuel ratio (lambda). An increase in combustion temperature causes an increase in the amount of $NO_x$ present in the engine exhaust. Therefore, it is desirable to control the combustion temperature in order to limit the amount of $NO_x$ present in the exhaust.

One method for limiting or controlling the combustion temperature has been to recirculate a portion of the exhaust gas back to the engine air intake. It is understood that because the exhaust gas has relatively low oxygen content, this results in a combustion mixture that will burn at a lower temperature. The lower combustion temperature, in turn, reduces the amounts of NOx produced during combustion.

It is also desirable to maximize combustion efficiency, which has traditionally been accomplished by running the combustion engine at or near a selected ignition timing. However, it has been noted that unacceptably high levels of $NO_x$ typically are produced when the engine operates at or near such conditions. In order to inhibit the formation and emission of $NO_x$, it is necessary to limit the peak combustion pressure to a threshold value.

One known technique for limiting combustion pressure involves the recirculation of exhaust gases through the induction passage of the combustion chamber as an increase in recirculation of exhaust gases will reduce peak combustion pressure, and therefore, the levels of $NO_x$. Accordingly, the formation of undesirable oxides of nitrogen may be reduced by recirculating a portion of the exhaust gas back to the engine air/fuel intake passage so as to dilute the incoming air/fuel mixture with inert $H_2O$, and $CO_2$. The molar specific heat of these gases, and especially of $CO_2$, absorbs substantial thermal energy so as to lower peak cycle temperatures and/or pressures to levels conducive to reducing $NO_x$ formation.

While $NO_x$ formation decreases as the exhaust gas recirculation (EGR) flow increases such that it represents a threshold percentage of the exhaust gas constituents, this is accompanied by deterioration in engine performance, such as, an increase in engine roughness with increasing EGR. Therefore, one factor limiting the use of EGR is the amount of EGR-induced performance deterioration that can be tolerated before vehicle performance becomes unacceptable.

It has also been known to provide a recirculating control system that utilizes a sleeve having an outlet disposed in an air conduit, where the outlet of the sleeve is positionable along the air conduit to at least partly occlude the exhaust gas inlet and is movable along a portion of the air conduit to vary the extent of occlusion of the exhaust gas inlet in order to regulate flow of exhaust gas into the air conduit. It has further been contemplated that a cross-sectional area of the outlet end of the sleeve may advantageously be reduced and may or may not be positionable to fully occlude the exhaust gas inlet in order to prevent flow of exhaust gas into the air conduit. In addition, a streamlined body may advantageously be disposed in the air conduit. In this manner, throttling of the inlet air flowing through the sleeve occurs in the reduced portion resulting in a venturi.

Use of EGR however, presents additional challenges. For example, on a diesel engine, during some specific circumstances, the exhaust gas pressure ahead of the turbocharger's turbine at times may be greater than the fresh air pressure in the inlet pipe. This can occur during certain engine operating modes such as: 1) high engine speed/high exhaust mass flow. The turbine becomes choked resulting in low turbocharger efficiency and high exhaust pressures upstream of the turbine (higher than boost pressure); and 2) during engine transients/acceleration when exhaust pulses have high amplitude but the turbocharger's inertia has caused the turbocharger not to speed/spool up yet (turbo lag).

During such operating modes, EGR flow would be substantial (exceeding the desired) even without venturi suction effect in the inlet pipe. Accordingly, EGR flow must be limited. An additional EGR-throttling is necessary. During transients, there is also a need to completely shut-off the EGR supply (i.e. to limit smoke).

What is desired therefore, is a control scheme for use with an EGR that allows for increased control of the EGR system under various operating conditions.

SUMMARY OF THE INVENTION

The present system is therefore directed toward a control system for variously controlling the mixing of first and second gas flows, such as, in a combustion engine input air flow and an EGR flow.

According to the above-listed problems associated with existing EGR control systems, there is a need to separately control the input air flow and the EGR flow, i.e. using two separate "valves."

While an EGR throttle could be integrated in the venturi, there are several reasons that it is preferable to generate the throttling in the EGR pipe relatively close to the exhaust manifold. For example, 1) one reason is to minimize the volume enclosed by the EGR system (i.e. pipes, cooler, etc.) when shut-off. A relatively large volume acts as a damper of the exhaust pulses, making the turbocharger system less efficient and causes a greater spool up time. Depending on the EGR-piping layout, there may also be pressure pulse "cross talk" between the separated exhaust manifolds, which lowers the engine's gas exchange efficiency. 2) Another reason for having the EGR control valve close to the exhaust manifold is to minimize the risk to condensate exhaust gases. Exhaust condensate is undesirable and could cause friction in the throttle or extensive wear. Droplets could wear valve or piping when hitting it at high speed or the condensate could accumulate in crevices and freeze in case of, for example, winter operation. If the EGR-cooler is upstream of the EGR throttle, the cooling effect could also cause condensation. Further, leakage past a partially or fully closed EGR throttle could cause condensation if the initial temperature is not high enough.

Accordingly, it is desirable to utilize two separate controls for controlling the EGR flow. The first may be positioned within the air inlet piping for suction of EGR (the venturi), and the second may be positioned in the EGR pipe relatively close to the exhaust manifold for limiting the EGR flow (the EGR throttle).

In one aspect of the invention a streamlined displaceable body, provided as part of the flow regulator, is positioned within an inlet section of the pipe. The flow regulator comprises a pipe section with a radial EGR supply flow and an essentially freely suspended displaceable body in it. The displaceable body may be displaced in the direction of the flow and is preferably designed such that the instantaneous throttling of fresh air is always greatest in the immediate vicinity of the inlet for supply of exhaust gases, independently of the position of the displaceable body. Accordingly, it is included that the throttling varies optimally during the regulation as a consequence of the variation with respect to the flow area of fresh air between the body and wall of the pipe during supply of exhaust gases. In this way, the varying requirement for pumping is satisfied, with a minimum of pressure losses.

While the flow regulator as previously discussed provides significant benefits, the use of multiple valves (i.e. proportional, Pulse Width Modulated "PWM", etc.), historically required by sophisticated control schemes are quite costly, increase the complexity of the control system and require greater space.

Accordingly, in one advantageous embodiment of the present invention, it is contemplated to provide a separate restrictor/shutoff valve for the EGR system that is positioned upstream in the exhaust recirculation piping from the displaceable body, so as to provide a stepwise control strategy. The restrictor/shutoff valve may be designed to actuate only when the displaceable body is, for example, fully moved upstream in the fluid flow. Once the displaceable body is moved a maximum distance, then the restrictor/shutoff valve for the EGR system may actuate. In this manner a stepwise or a sequential control scheme may be achieved utilizing both the restrictor/shutoff valve and the displaceable body.

This control scheme provides significant benefits over previously known EGR systems because this control scheme allows for use of a single control valve. Even though only one control valve is used, the system still provides for sophisticated flow control. For example, when controlling an actuator (i.e. pneumatic, hydraulic, electric, etc.) with the present system, the displaceable body is moved in the pipe, which may be used to selectively control the actuator from, for example, 0 psi-50 psi. Once the displaceable body reaches a maximum displacement, only then is the restrictor/shutoff valve actuated. Upon actuation, the restrictor/shutoff valve then in turn controls the actuator from, for example, 50 psi-an upper limit. In this particular example, the EGR system can provide a stepwise control by; 1) utilizing a single control valve and 2) selection of the sizes of the cylinders. Therefore, because only one control valve is used, significant cost savings in manufacture are realized in addition to providing a simplified control circuit.

It should also be noted that, as only one control valve is used, only one control CPU and electric driver is needed for control. This allows for increased cost savings and a simplified system design.

For this application the following terms and definitions shall apply: The terms "coupled", "coupled to", and "coupled with" as used herein each mean a relationship between or among two or more devices, apparatus, components, networks, systems, subsystems, and/or means, constituting any one or more of (a) a connection, whether direct or through one or more other devices, apparatus, components, networks, systems, subsystems, or means, (b) a communications relationship, whether direct or through one or more other devices, apparatus, components, networks, systems, subsystems, or means, and/or (c) a functional relationship in which the operation of any one or more devices, apparatus, components, networks, systems, subsystems, or means depends, in whole or in part, on the operation of any one or more others thereof.

The terms "first" and "second" are used to distinguish one element, set, object or thing from another, and are not used to designate relative position or arrangement in time.

In one advantageous embodiment, a system for controlling the mixture of air and recirculating exhaust gas is provided comprising, an air conduit defined by a wall for communicating air therethrough, and an exhaust gas inlet passing through the wall of the air conduit for introducing exhaust gas into the air conduit. The system further comprises, an air flow regulator, at least partially positioned in the air conduit, the air flow regulator regulating the amount of air passing through the air conduit, and a restriction valve, positioned ahead of the exhaust gas inlet in an exhaust gas recirculation conduit, the restriction valve regulating the amount of exhaust gas introduced into the air conduit. The system is provided such that the air flow regulator and the restriction valve provide a sequential control scheme, where during a first pressure range the flow regulator is actuated and during a second pressure range the restriction valve is actuated.

In another advantageous embodiment, a system for controlling the mixture of air and recirculating exhaust gas is provided comprising, an air conduit defined by a wall for communicating air therethrough, and an exhaust gas inlet passing through the wall of the air conduit for introducing exhaust gas into the air conduit, the exhaust gas inlet coupled to an exhaust gas recirculation conduit. The system further comprises, an air flow regulator, at least partially positioned in the air conduit, the air inlet flow regulator regulating the amount of air passing through the air conduit, and a restriction valve, positioned in the exhaust gas recirculation conduit, the restriction valve regulating the amount of exhaust gas introduced into the air conduit. The system still further comprises a first pressure range, during which the air flow regulator is actuated, and a second pressure range, during which the restriction valve is actuated. The system is provided such that, the air flow regulator and the restriction valve operate in a sequential manner, so that when the air flow regulator is fully actuated, then the restriction valve will actuate.

In still another advantageous embodiment, a method for controlling the mixture of air and recirculating exhaust gas in a combustion engine is provided comprising the step of, drawing air in through an air conduit, and coupling an exhaust gas conduit to the air conduit. The method further comprises the steps of, passing exhaust gas into the exhaust gas conduit to recirculate into the air conduit, controlling an air flow regulator, which regulates the amount of air passing through the air conduit, over a first pressure range, and controlling a restriction valve, which regulates the amount of exhaust gas passing through the exhaust gas conduit, over a second pressure range. The method is provided such that the air flow regulator and the restriction valve operate in a sequential manner such that when the air flow regulator is fully actuated, then the restriction valve will actuate.

Other objects of the invention and its particular features and advantages will become more apparent from consideration of the following drawings and accompanying detailed description.

DETAILED DESCRIPTION OF THE INVENTION

Figure 1:
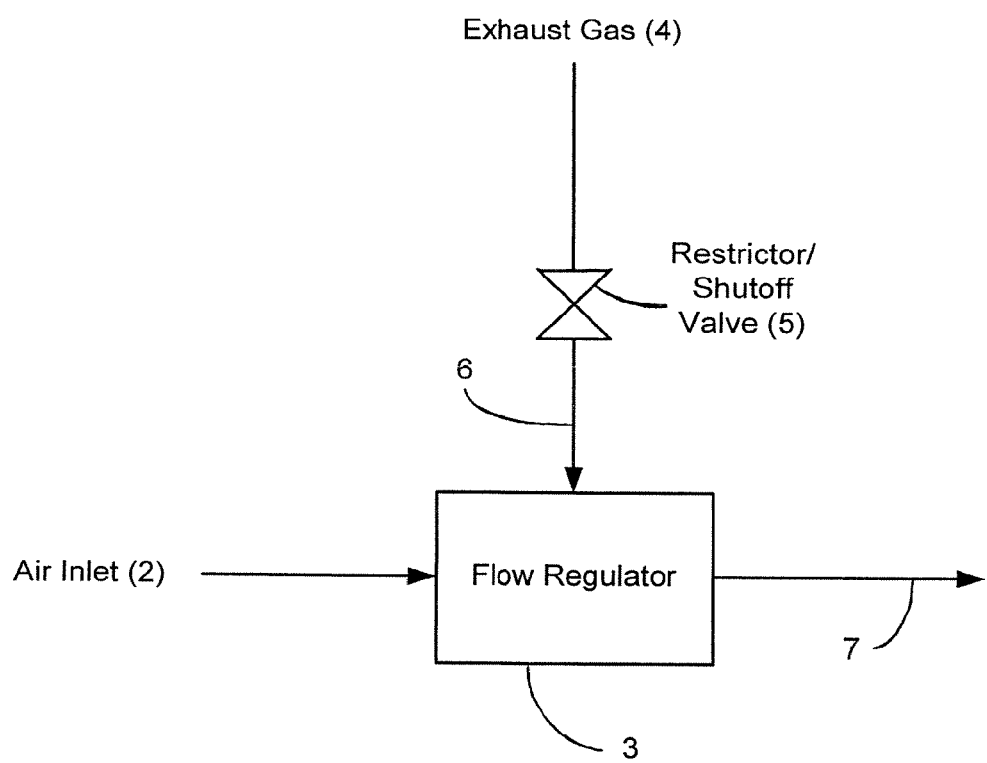
FIG. 1 is a block diagram of one advantageous embodiment of the present invention.

Referring now to the drawings, wherein like reference numerals designate corresponding structure throughout the views.

Referring now to FIG. 1, system 10 is illustrated. In FIG. 1, air inlet 2 is illustrated as coupled to flow regulator 3. Exhaust gas input 4 is fluidly coupled to restrictor/shutoff valve 5, which is also fluidly coupled 6 to flow regulator 3. Flow regulator 3 then receives both air inlet 2 and exhaust gas input 4 and outputs fluid flow 7 to. In this advantageous embodiment, flow regulator 3 operates in tandem with restrictor/shutoff valve 5 to variably control the flow of both air inlet 2 and exhaust gas input 4. For example, restrictor/shutoff valve 5 may be variably actuated to open/close so as to limit exhaust air flow to flow regulator 3.

In this particular embodiment, restrictor/shutoff valve 5 for the EGR system that is positioned upstream in the exhaust recirculation piping from flow regulator 3, so as to provide a stepwise control strategy. For example, restrictor/shutoff valve 5 may be designed to actuate only when flow regulator 3 has been fully actuated. Once fully actuated, restrictor/shutoff valve 5 may then be actuated. In this manner a stepwise or a sequential control scheme may be achieved utilizing both restrictor/shutoff valve 5 and flow regulator 3.

A primary benefit of this particular control scheme embodiment allows for use of a single flow regulator 3 (control valve). Even though only one flow regulator 3 (control valve) is utilized, the system provides for sophisticated flow control. In one advantageous embodiment, flow regulator 3 may be used to selectively control an actuator from, for example, 0 psi-50 psi. However, once flow regulator 3 reaches a maximum actuation, only then is restrictor/shutoff valve 5 actuated. Upon actuation, restrictor/shutoff valve 5 then in turn controls the actuator from, for example, 50 psi—an upper limit (i.e. 100 psi).

Figure 2:
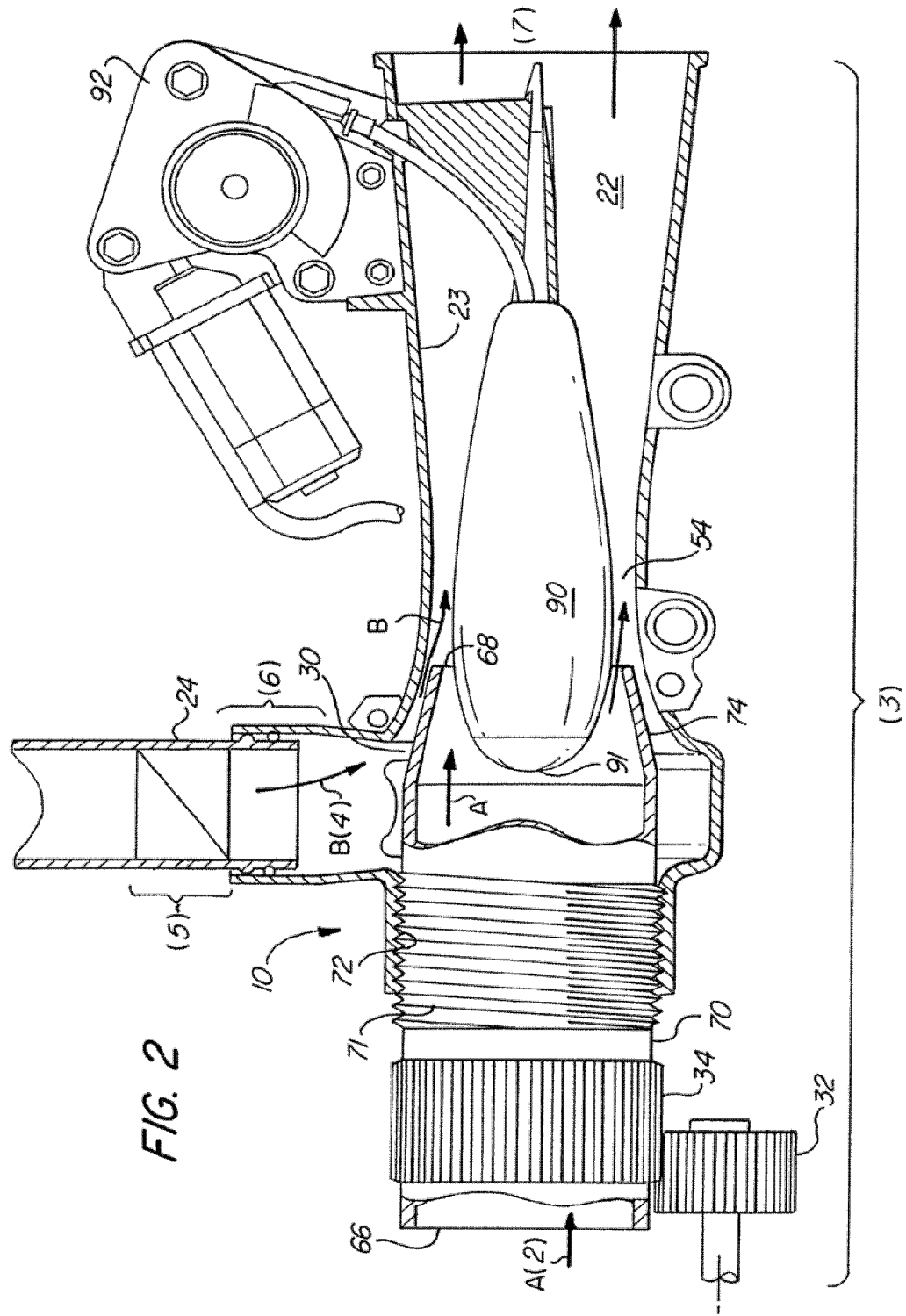
FIG. 2 is a side view in partial cross-section of an exhaust gas recirculation system in according to FIG. 1.

Referring now to FIG. 2, the system 10 includes an air conduit 22 defined by a wall 23, through which inlet air is communicated to an engine (not shown). An exhaust gas inlet 30 passes through the wall 23, through which recirculating exhaust gas is introduced from an exhaust gas conduit 24 into the air conduit 22 (indicated by arrows B).

A sleeve 70, through which the inlet air flows, has an inlet end 66 and an outlet end 68, and at least the outlet end 68 is positioned within the conduit wall 23. Accordingly, inlet air enters the sleeve 70 via inlet end 66, flows through the sleeve 70, and exits the sleeve 70 via outlet end 68 (indicated by arrows A). The sleeve 70 can be positioned such that the outlet end 68 at least partially occludes the inlet 30, thereby decreasing the flow of exhaust gas into the air conduit 22. At least a portion of the sleeve 70 can be displaced longitudinally along the air conduit 22 to alter the extent to which the outlet end 68 occludes the inlet 30, allowing the introduction of exhaust gas into the air conduit 22 to be regulated.

Also illustrated in FIG. 2 is restrictor/shutoff valve 5, which is advantageously positioned in exhaust gas conduit 24. It is contemplated that restrictor/shutoff valve 5 may comprise virtually any type of controllable valve that may effectively shutoff fluid flow of the exhaust gas. Restrictor/shutoff valve 5 is advantageously positioned in the exhaust gas conduit 24 relatively close to inlet 30 for limiting the EGR flow (the EGR throttle).

Referring back now to the operation of flow regulator 3, it is contemplated that a portion of the sleeve 70 has a threaded outer surface 71, and a portion of the conduit wall 23 has a corresponding, threaded inner surface 72 for engaging the threaded sleeve surface 71. As a result, the outlet end 68 can be displaced along the air conduit 22 by simply rotating the sleeve 70. In this way, the flow of exhaust gas into the conduit 22 can be accurately and precisely controlled. In certain embodiments, the sleeve 70 and the conduit 22 may be coaxial.

Various drive mechanisms may be employed to drive the sleeve 70 back and forth through the air conduit 22. For example, as shown in FIG. 2, the system 10 may include a threaded sleeve 70, and thus, may include a drive mechanism designed to cause rotational movement of the sleeve 70. In these embodiments, the drive mechanism may, for instance, comprise a gear 32 having a rotational axis parallel to that of the sleeve 70, and the sleeve 70 may include an outer surface 34 near the inlet end 66 to mate with the gear 32, such that clockwise and counterclockwise rotation of the gear 32 can drive the sleeve 70 forward and backward along the conduit 22.

In certain advantageous embodiments, the cross-sectional area of the outlet end 68 is smaller than the cross-sectional area of the inlet end 66, such that some throttling of the inlet air flowing through the sleeve 70 occurs in this reduced portion. In certain embodiments, this reduced portion is simply a necked portion of the sleeve 70, and in some embodiments, it comprises a tapered section 74, which, for example, may have a frustoconical shape. Likewise, in some embodiments, the cross-sectional area of a portion of the conduit 22 in which the outer end 68 of the sleeve 70 moves is also reduced, providing a similar throttling effect. In some embodiments, this reduced section is necked or tapered, resulting in a venturi 54.

When the sleeve 70 is rotated longitudinally in the direction of the venturi 54, the annular, tapered section 74 of the sleeve 70 approaches the annular, tapered wall of the venturi 54. In this way, the sleeve 70, in conjunction with the venturi 54, acts as a flow regulator for the exhaust gas entering the conduit 22 and mixing with the inlet air. The tapered section 74 of the sleeve 70 is designed with a cross-sectional area that decreases towards the tip of the outlet end 68. Similarly, the venturi 54 has a cross-sectional area that decreases in the direction of flow of the conduit 22. Furthermore, this reduction in the cross-sectional area of the venturi 54 is greater than the reduction in the cross-sectional area of the outlet end 68. Because of this arrangement, as the sleeve 70 is rotated in the direction of the flow through the conduit 22, the inlet 30 becomes smaller, restricting the amount of exhaust gas that is communicated into the air conduit 22.

Moreover, as the size of the inlet 30 changes in accordance with the movement of the outlet end 68 of the sleeve 70, the point of entry of the exhaust gas into the flow of inlet air likewise changes. Accordingly, the greatest throttling of the inlet air flowing through the air conduit 22 (i.e., passing through the outlet end 68 of the sleeve 70) is always achieved at the point at which the exhaust gas enters the conduit 22, independently of the position of the sleeve 70.

In other embodiments, an actuator 92 in provided for displacing the streamlined body 90 backwards and forwards along the conduit 22, causing the tapered end 91 to move back and forth through the outlet end 68. In this way, the flow of inlet air through the conduit 22 can be altered independently of the alteration of the recirculating exhaust gas flow. The actuator 92 may be located outside of the conduit 22 and connected to the body 90, or may be located within the streamlined body 90 itself.

With this arrangement, in addition to generally providing desirable mixing and pumping effects, the sleeve 70 can be used to control the speed of the recirculating exhaust gas, while the body 90 can be used to control the speed of the inlet air, and relative speed between the two can be controlled by coordinating the movement of the two. Furthermore, in certain embodiments, the sleeve 70 may be advanced far enough along the conduit 22 such that the flow of exhaust gas into the conduit 22 is completely shut off. The outlet end 68 can be advanced through the necking portion of the venturi 54 until it comes flush up against the wall of the conduit 22, just downstream of the maximum diameter of the body 90.

In some embodiments, the streamlined body 90 is disposed in the conduit 22 such that the maximum diameter of the body 90 is located downstream of the sleeve 70, and the body 90 is positioned substantially outside of the sleeve 70, as shown in FIG. 2. Accordingly, in these embodiments, the flow path is convergent until the point where the exhaust gas is introduced into the flow of the inlet air, and thus, does not become divergent until the two gases have mixed. However, in certain embodiments, the streamlined body 90 may also be located within the sleeve 70.

It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

Figure 3:
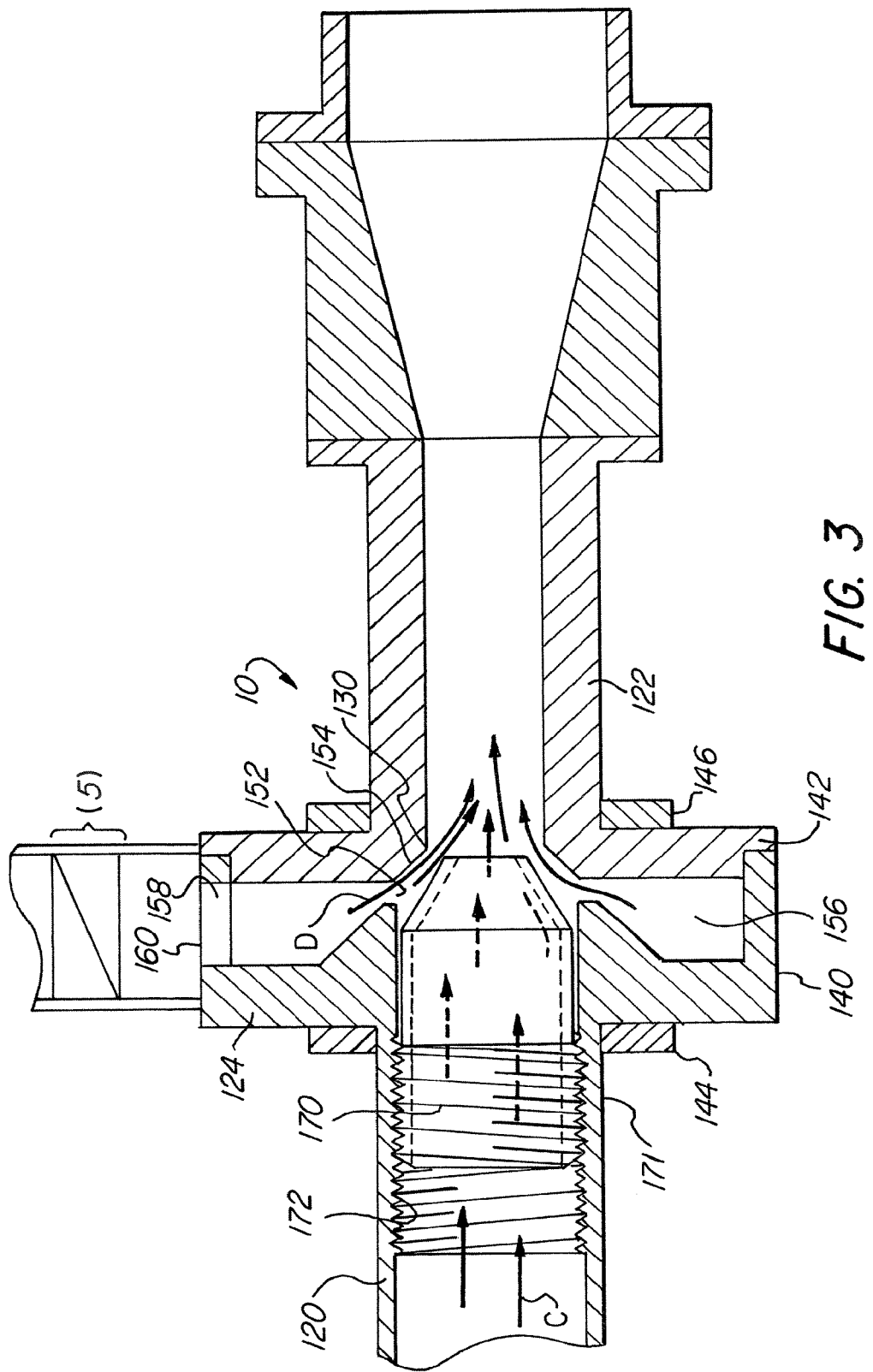
FIG. 3 is a side view in partial cross-section of an exhaust gas recirculation system in according to FIG. 1.
Figure 4:
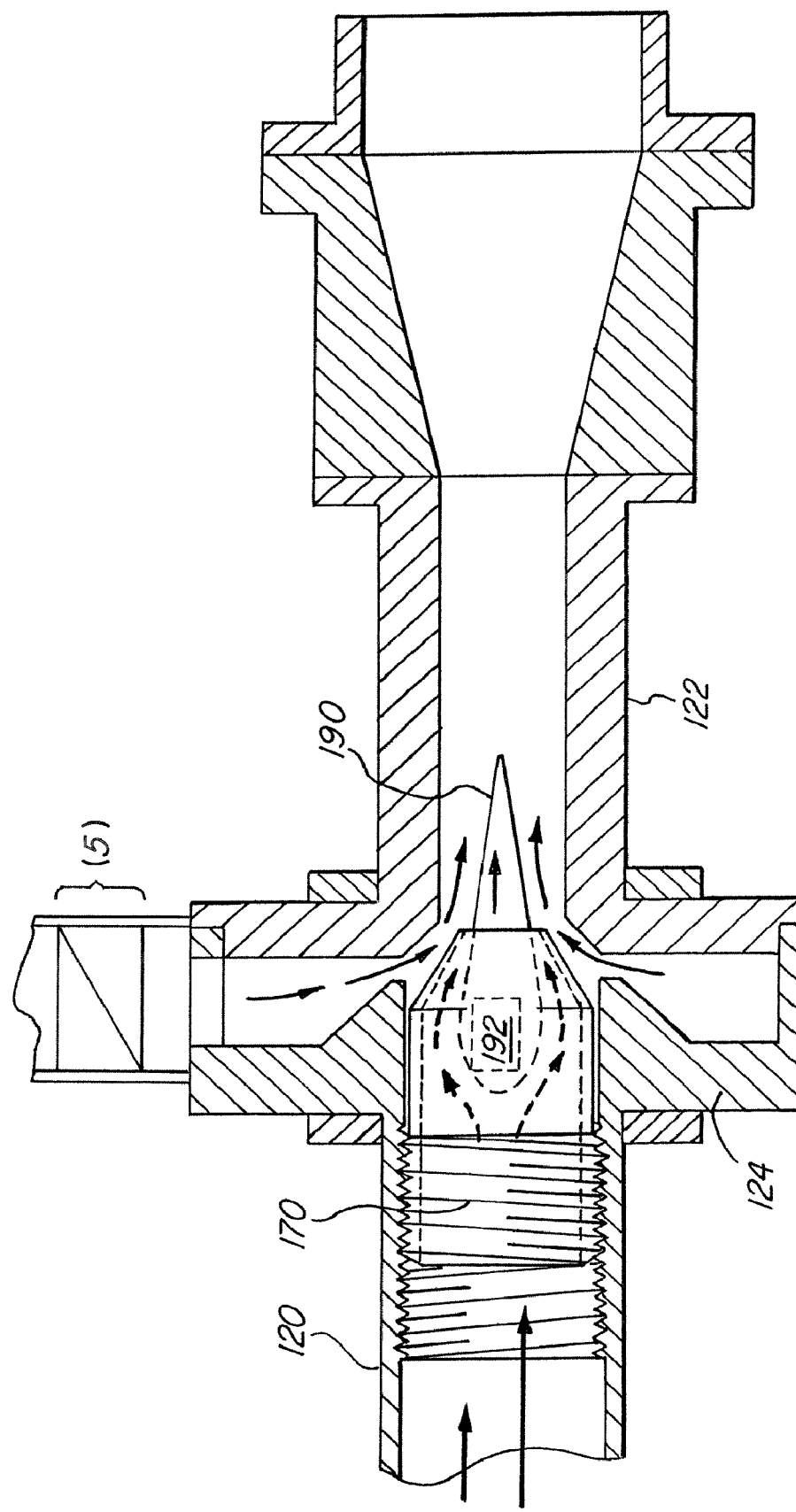
FIG. 4 is a side view in partial cross-section of an exhaust gas recirculation system in according to FIG. 3.

Another embodiment of the system 10 is illustrated in FIGS. 3-4. It should be noted that various features have been shown in the embodiment depicted in FIG. 2 that may be incorporated in the embodiment described below, and vice versa.

In this particular embodiment, the system 10 includes a first pipe section 120, a supply part 124, and a second pipe section 122, through which inlet air flows (indicated by arrows C). Recirculating exhaust gas is introduced into the flow of inlet air via the supply part 124, which creates an inlet 130 for this flow (indicated by arrows D).

In certain advantageous embodiments, the supply part 124 includes two parts 140, 142, which are inserted between two flanges 144, 146 of the two pipe sections 120, 122, respectively. However, in other embodiments, the supply part 124 may be a single, integral piece having a single, radial opening or a plurality of openings arranged in an annular fashion. Moreover, in some embodiments, the supply part 124 is separate from the pipe sections 120, 122, while in other embodiments, the supply part 124 is integrally formed with the piping 120, 122.

This arrangement results in a radial gap 152, through which the exhaust gas is communicated from the supply part 124 to the pipe section 122. In certain advantageous embodiments, the system includes a venturi part 154, such that a portion of the inner, annular wall of the piping 122 adjacent to the gap 152 is tapered, thereby extending the essentially planar gap 152 into an essentially frustoconical opening. A continuous, cylindrical cavity 156 exists around the gap 152, and a gasket 158 is placed between the two parts 140, 142. Accordingly, a desired distance for the gap 152 can be achieved by selecting the thickness of the gasket 158. A supply pipe (not shown) for the EGR supply flow can be mounted to an inlet port 160 of the supply part 124 to deliver the exhaust gases of the engine to the system 10.

A sleeve 170, as previously described, is moveably disposed fully within the pipe section 120. The sleeve 170 has a threaded outer surface 171 for engaging a threaded inner surface 172 of the pipe section 120, thereby enabling the sleeve 170 to be precisely displaced longitudinally thereal-ong, and the sleeve 170 has a tapered end for throttling the inlet air flowing through the sleeve 170.

As noted above and shown in FIG. 4, in some embodiments, a streamlined body 190 is employed to allow further, variable throttling of the inlet air flowing out of the sleeve 170. The body 190 may be disposed primarily outside or inside of the sleeve 170 and an actuator 192 for displacing the streamlined body 190 backwards and forwards through the sleeve 170 is either located within or connected to the body 190.

In operation, the inlet air is typically cooled in the conventional manner downstream of a turbocharger by an intercooler (not shown), and the recirculated exhaust gases are cooled in the same way via a separate EGR cooler before being mixed with the inlet air flow. The above-described system for regulating flow can be placed at any location downstream of the turbocharger. However, in certain advantageous embodiments, the flow regulator is preferably located downstream of the intercooler to prevent the latter from becoming contaminated with soot or being corroded by the acidic exhaust gases.

Figure 5:
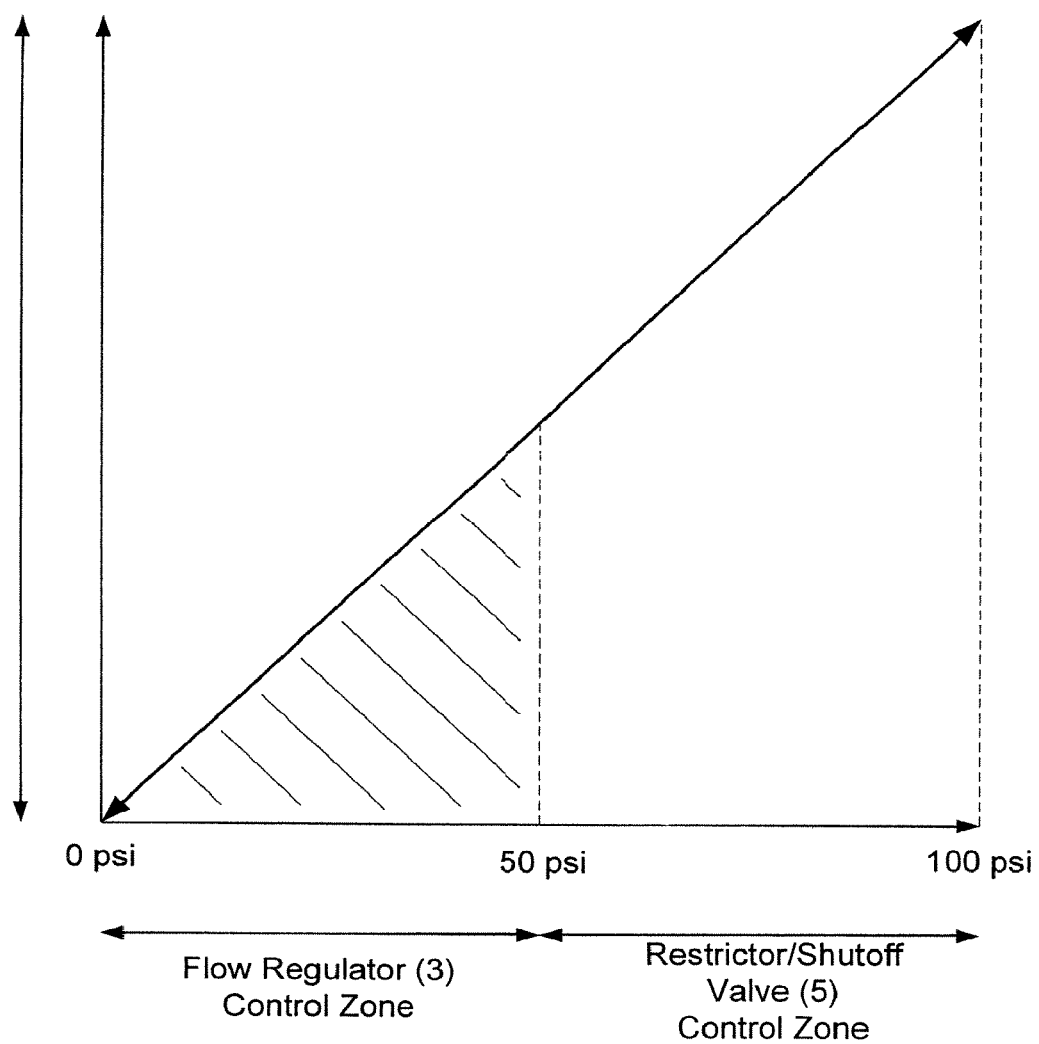
FIG. 5 is a graph illustrating an example one advantageous control scheme according to FIG. 1.

FIG. 5 is a graph illustrating how the control scheme, may effectively be used with, for example, a pneumatic actuator (not shown). In this particular example, at 0 psi, the pneumatic actuator is not actuated. However, from 0 psi-50 psi, actuation of flow regulator 3 controls the actuator (Flow Regulator (3) Control Zone). In this particular example, at approximately 50 psi, flow regulator 3 reaches maximum actuation and from that point onward, restrictor/shutoff valve 5 provides control for the actuator (Restrictor/Shutoff Valve (5) Control Zone). While in this example, the total control zone ranges from 0 psi to 100 psi, virtually any control range may be used and selected according to the application and arrangement of features.

In this manner a stepwise or sequential control scheme may be achieved with use of only one control valve to control the amount of the exhaust gas re-circulated to the combustion engine. As previously discussed, many differing types of control valve may effectively be used, such as for example, a proportional valve, a PWM valve, and the like.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for controlling the mixture of air and recirculating exhaust gas, comprising:
   an air conduit defined by a wall for communicating air therethrough;
   an exhaust gas inlet passing through the wall of said air conduit for introducing exhaust gas into said air conduit; and
   an air flow regulator, at least partially positioned in said air conduit, said air flow regulator regulating the amount of air passing through said air conduit;
   a restriction valve, positioned ahead of said exhaust gas inlet in an exhaust gas recirculation conduit, said restriction valve regulating the amount of exhaust gas introduced into said air conduit;
   said air flow regulator and said restriction valve providing a sequential control scheme where during a first pressure range said flow regulator is actuated and during a second pressure range said restriction valve is actuated.

2. The system according to claim 1 wherein said air flow regulator comprises a proportional valve.

3. The system according to claim 1, wherein said first pressure range and said second pressure range do not overlap.

4. The system according to claim 3, wherein said first pressure range is from approximately 0 psi to approximately 50 psi, and said second pressure range is from approximately 50 psi to approximately 100 psi.

5. The system according to claim 1 wherein said air flow regulator comprises a sleeve at least partly disposed in said air conduit, said sleeve having an inlet end through which air enters said sleeve and an outlet end through which air flowing through said sleeve exits said sleeve into said air conduit, the outlet end of said sleeve being disposed in said air conduit.

6. The system according to claim 5 wherein the outlet end of said sleeve is positionable along said air conduit to at least partly occlude said exhaust gas inlet and is movable along a portion of said air conduit to vary the extent of occlusion of said exhaust gas inlet in order to regulate flow of exhaust gas into said air conduit.

7. The system of claim 5, further comprising a streamlined body disposed in said air conduit, wherein said body is stationary with respect to said conduit and the outlet end of said sleeve is moveable over at least part of said body to at least partly occlude the outlet end of said sleeve.

8. The system according to claim 5, further comprising a streamlined body disposed in said air conduit and positionable along said air conduit to at least partly occlude the outlet end of said sleeve.

9. The system of claim 8, further comprising an actuator for moving said streamlined body along said air conduit to vary the extent of occlusion of the outlet end of said sleeve in order to regulate flow of air out of said sleeve.

10. The system of claim 8, wherein said streamlined body is substantially located outside of said sleeve.

11. The system of claim 8, wherein said streamlined body includes a tapered end moveable through the outlet end of said sleeve.

12. The system of claim 11, wherein the tapered end of said streamlined body is ovoid.

13. A system for controlling the mixture of air and recirculating exhaust gas, comprising:
   an air conduit defined by a wall for communicating air therethrough;
   an exhaust gas inlet passing through the wall of said air conduit for introducing exhaust gas into said air conduit, said exhaust gas inlet coupled to an exhaust gas recirculation conduit;
   an air flow regulator, at least partially positioned in said air conduit, said air inlet flow regulator regulating the amount of air passing through said air conduit;
   a restriction valve, positioned in the exhaust gas recirculation conduit, said restriction valve regulating the amount of exhaust gas introduced into said air conduit;
   a first pressure range during which said air flow regulator is actuated; and
   a second pressure range during which said restriction valve is actuated;
   said air flow regulator and said restriction valve operating in a sequential manner such that when said air flow regulator is fully actuated, then said restriction valve will actuate.

14. The system according to claim 13, wherein said first pressure range is from approximately 0 psi to approximately 50 psi, and said second pressure range is from approximately 50 psi to approximately 100 psi.

15. The system according to claim 13 wherein said air flow regulator comprises a sleeve at least partly disposed in said air conduit, said sleeve having an inlet end through which air enters said sleeve and an outlet end through which air flowing through said sleeve exits said sleeve into said air conduit, the outlet end of said sleeve being disposed in said air conduit.

16. The system according to claim 15 wherein the outlet end of said sleeve is positionable along said air conduit to at least partly occlude said exhaust gas inlet and is movable along a portion of said air conduit to vary the extent of occlusion of said exhaust gas inlet in order to regulate flow of exhaust gas into said air conduit.

17. The system of claim 15, further comprising a streamlined body disposed in said air conduit, wherein said body is stationary with respect to said conduit and the outlet end of said sleeve is moveable over at least part of said body to at least partly occlude the outlet end of said sleeve.

18. The system according to claim 15, further comprising a streamlined body disposed in said air conduit and positionable along said air conduit to at least partly occlude the outlet end of said sleeve.

19. The system of claim 18, further comprising an actuator for moving said streamlined body along said air conduit to vary the extent of occlusion of the outlet end of said sleeve in order to regulate flow of air out of said sleeve.

20. The system of claim 18, wherein said streamlined body is substantially located outside of said sleeve.

21. The system of claim 18, wherein said streamlined body includes a tapered end moveable through the outlet end of said sleeve.

22. The system of claim 21, wherein the tapered end of said streamlined body is ovoid.

23. A method for controlling the mixture of air and recirculating exhaust gas in a combustion engine, comprising the step of:
   drawing air in through an air conduit;
   coupling an exhaust gas conduit to the air conduit;
   passing exhaust gas into the exhaust gas conduit to recirculate into the air conduit;
   controlling an air flow regulator, which regulates the amount of air passing through the air conduit, over a first pressure range; and controlling a restriction valve, which regulates the amount of exhaust gas passing through the exhaust gas conduit, over a second pressure range;

wherein the air flow regulator and the restriction valve operate in a sequential manner such that when the air flow regulator is fully actuated, then the restriction valve will actuate.

24. The method according to claim 23, wherein said first pressure range is from approximately 0 psi to approximately 50 psi, and said second pressure range is from approximately 50 psi to approximately 100 psi.

25. The method according to claim 23 wherein the air flow regulator includes a sleeve at least partly disposed in the air conduit and having an inlet end through which air enters said sleeve and an outlet end through which air flowing through said sleeve exits.

26. The method according to claim 25 further comprising the steps of variably positioning the outlet end of the sleeve along the air conduit to at least partly occlude the exhaust gas inlet in order to regulate flow of exhaust gas into said air conduit.

27. The method according to claim 25, further comprising the steps of disposing a streamlined body in the air conduit and variably positioning the streamlined body along the air conduit to at least partly occlude the outlet end of the sleeve.

28. The method of claim 27, further comprising the steps of moving the streamlined body along the air conduit to vary the extent of occlusion of the outlet end of the sleeve in order to regulate flow of air out of the sleeve.

29. The method of claim 27, wherein the streamlined body includes a tapered end moveable through the outlet end of the sleeve.

* * * * *